US009813227B2

(12) United States Patent
Su

(10) Patent No.: US 9,813,227 B2
(45) Date of Patent: *Nov. 7, 2017

(54) AT-RATE SERDES CLOCK DATA RECOVERY WITH CONTROLLABLE OFFSET

(71) Applicant: Oracle International Corporation, Redwood City, CA (US)

(72) Inventor: Jianghui Su, Santa Clara, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/000,028

(22) Filed: Jan. 18, 2016

(65) Prior Publication Data

US 2016/0241383 A1    Aug. 18, 2016

Related U.S. Application Data

(63) Continuation-in-part of application No. 14/146,605, filed on Jan. 2, 2014, now Pat. No. 9,306,732.

(51) Int. Cl.
*H04L 7/00* (2006.01)
*H04L 7/02* (2006.01)
*H04L 7/033* (2006.01)

(52) U.S. Cl.
CPC .......... *H04L 7/0087* (2013.01); *H04L 7/0033* (2013.01); *H04L 7/02* (2013.01); *H04L 7/0334* (2013.01)

(58) Field of Classification Search
CPC ...................................................... H04L 7/0087
USPC .................................................. 375/355, 354
See application file for complete search history.

(56) References Cited

U.S. PATENT DOCUMENTS

| | | | | |
|---|---|---|---|---|
| 5,121,411 | A * | 6/1992 | Fluharty | H04L 7/0334 327/141 |
| 6,798,857 | B2 * | 9/2004 | Gregorian | H03L 7/0814 375/360 |
| 8,000,425 | B2 * | 8/2011 | Chan | H04L 7/033 375/354 |
| 8,687,738 | B1 * | 4/2014 | Lee | H04L 7/033 327/141 |
| 8,744,024 | B2 * | 6/2014 | Huang | H04L 7/0054 375/348 |

(Continued)

*Primary Examiner* — Helene Tayong
(74) *Attorney, Agent, or Firm* — Marsh Fischmann & Breyfogle LLP; Daniel J. Sherwinter

(57) ABSTRACT

Embodiments include systems and methods for applying a controllable early/late offset to an at-rate clock data recovery (CDR) system. Some embodiments operate in context of a CDR circuit of a serializer/deserializer (SERDES). For example, slope asymmetry around the first precursor of the channel pulse response for the SERDES can tend to skew at-rate CDR determinations of whether to advance or retard clocking. Accordingly, embodiments use asymmetric voting thresholds for generating each of the advance and retard signals in an attempt to de-skew the voting results and effectively tune the CDR to a position either earlier or later than the first precursor zero crossing (i.e., h(−1)=0) position. This can improve link margin and data recovery, particularly for long data channels and/or at higher data rates.

13 Claims, 6 Drawing Sheets

(56) References Cited

U.S. PATENT DOCUMENTS

2007/0153837 A1* 7/2007 Meir ............... H03L 7/0812
370/503
2010/0158177 A1* 6/2010 Doblar ............. H04L 7/0062
375/354

* cited by examiner

| VOTE COUNT | | 620a THRESHOLDS | | 620b THRESHOLDS | | 620c THRESHOLDS | | 620d THRESHOLDS | | 620e THRESHOLDS | |
|---|---|---|---|---|---|---|---|---|---|---|---|
| EARLY | LATE | ADV 7 | RET 7 | ADV 0 | RET 7 | ADV 0 | RET 0 | ADV -8 | RET 7 | ADV -5 | RET 2 |
| 30 | 20 | ADV | NONE | ADV | NONE | ADV | NONE | ADV | NONE | ADV | NONE |
| 30 | 21 | ADV | NONE | ADV | NONE | ADV | NONE | ADV | NONE | ADV | NONE |
| 30 | 22 | ADV | NONE | ADV | NONE | ADV | NONE | ADV | NONE | ADV | NONE |
| 30 | 23 | NONE | NONE | ADV | NONE | ADV | NONE | ADV | NONE | ADV | NONE |
| 30 | 24 | NONE | NONE | ADV | NONE | ADV | NONE | ADV | NONE | ADV | NONE |
| 30 | 25 | NONE | NONE | ADV | NONE | ADV | NONE | ADV | NONE | ADV | NONE |
| 30 | 26 | NONE | NONE | ADV | NONE | ADV | NONE | ADV | NONE | ADV | NONE |
| 30 | 27 | NONE | NONE | ADV | NONE | ADV | NONE | ADV | NONE | ADV | NONE |
| 30 | 28 | NONE | NONE | ADV | NONE | ADV | NONE | ADV | NONE | ADV | NONE |
| 30 | 29 | NONE | NONE | ADV | NONE | ADV | NONE | ADV | NONE | ADV | NONE |
| 30 | 30 | NONE | NONE | NONE | NONE | NONE | NONE | ADV | NONE | ADV | NONE |
| 30 | 31 | NONE | NONE | NONE | NONE | NONE | RET | ADV | NONE | ADV | RET |
| 30 | 32 | NONE | NONE | NONE | NONE | NONE | RET | ADV | NONE | ADV | RET |
| 30 | 33 | NONE | NONE | NONE | NONE | NONE | RET | ADV | NONE | NONE | RET |
| 30 | 34 | NONE | NONE | NONE | NONE | NONE | RET | ADV | NONE | NONE | RET |
| 30 | 35 | NONE | RET | NONE | NONE | NONE | RET | NONE | NONE | NONE | RET |
| 30 | 36 | NONE | RET | NONE | NONE | NONE | RET | NONE | RET | NONE | RET |
| 30 | 37 | NONE | RET | NONE | NONE | NONE | RET | NONE | RET | NONE | RET |
| 30 | 38 | NONE | RET | NONE | RET | NONE | RET | NONE | RET | NONE | RET |
| 30 | 39 | NONE | RET | NONE | NONE | NONE | RET | NONE | RET | NONE | RET |
| 30 | 40 | NONE | RET | NONE | RET | NONE | RET | NONE | RET | NONE | RET |

AT-RATE SERDES CLOCK DATA RECOVERY WITH CONTROLLABLE OFFSET

FIELD

Embodiments relate generally to serializer/deserializer (SERDES) circuits, and, more particularly, to techniques for at-rate clock data recovery using a controllable early-late offset.

BACKGROUND

Serializer/deserializer (SERDES) circuits are becoming ubiquitous in many computational environments. The SERDES can compress a relatively wide, parallel input into a relatively narrow, serial signal (e.g., a single "bit," differential signal) for communication over a serial bus. The serial bus switches at an appreciably higher rate than the parallel bus, and serial communication of the data stream tends to reduce cost, complexity, power, and board real estate relative to comparable parallel communications. As bus speeds increase, parallel communications manifest even higher power consumption and more issues relating to timing (e.g., skew mismatches and bit misalignment), making SERDES circuits even more attractive.

Typically, the SERDES has one or more components that sample a received analog serial signal into discrete bits for various purposes. For example, the SERDES can include clock data recovery (CDR) and decision feedback equalization (DFE) adaptation components that can attempt to shift clocking locations to optimize sampling reliability. This can involve determining where signal transitions (e.g., zero-crossings) occur, which can often be frustrated by clock jitter, noisy data, small signal levels, and/or other difficult conditions.

BRIEF SUMMARY

Among other things, embodiments provide novel systems and methods for applying a controllable early/late offset to an at-rate clock data recovery (CDR) system. Some embodiments operate in context of a CDR circuit of a serializer/deserializer (SERDES). For example, slope asymmetry around the first precursor of the channel pulse response for the SERDES can tend to skew at-rate CDR determinations of whether to advance or retard clocking. Accordingly, embodiments use asymmetric voting thresholds for generating each of the advance and retard signals in an attempt to de-skew the voting results and effectively tune the CDR to a position either earlier or later than the first precursor zero crossing (i.e., $h(-1)=0$) position. While "zero" crossings are referred to herein, embodiments can operate with any reference-level crossings, including where the reference level is zero or some other value.

Use of asymmetric voting thresholds can provide a number of features. For example, such techniques can tend to improve link margin and data recovery, particularly for long data channels and/or at higher data rates; tend to improve tuning of the actual CDR locking position; tend to improve the tracking rate of the CDR (e.g., in the presence of clock drift from sinusoidal jitter, spread spectrum clocking, asynchronous clocking, or the like, the number of votes generated may not be symmetrical, depending on whether the sampling point drifts to an early side or a late side relative to the incoming data, and different thresholds can help make the tracking behavior more consistent); tend to overcome CDR quantization errors (e.g., at high data rates, sampling uncertainty can be high (e.g. 20-30 mV), which can frustrate comparisons to zero, and the pulse shape can cause the CDR function to be less sensitive in the early region, which can result in locking uncertainty); etc.

According to one set of embodiments, a system is provided for at-rate clock data recovery. The system includes an offset circuit that operates to store an advance threshold and a retard threshold, and a voting circuit in communication with the offset circuit. One of the advance threshold or the retard threshold is negative. The voting circuit operates to: generate a number of votes each by measuring a pulse signal at a predetermined sample location and comparing the measurement to a reference level to generate an early vote when the measured pulse signal at the predetermined sample location compared to the reference level indicates that the sample location precedes a reference-level crossing associated with the predetermined sample location, and to generate a late vote when the measured pulse signal at the predetermined sample location compared to the reference level indicates that the reference-level crossing associated with the predetermined sample location precedes the sample location; generate an advance signal when the generated late votes exceeds the generated early votes by at least the advance threshold; and generate a retard signal when the generated early votes exceeds the generated late votes by at least the retard threshold.

According to another set of embodiments, a method is provided for at-rate clock data recovery. The method includes: generating a number of votes each by measuring a pulse signal at a predetermined sample location and comparing the measurement to a reference level, wherein each vote generated as an early vote when the measured pulse signal at the predetermined sample location compared to the reference level indicates that the sample location precedes a reference-level crossing associated with the predetermined sample location, and wherein each vote generated as a late vote when the measured pulse signal at the predetermined sample location compared to the reference level indicates that the reference-level crossing associated with the predetermined sample location precedes the sample location. The method further includes generating an advance signal when the generated late votes exceeds the generated early votes by at least a predetermined advance threshold; and generating a retard signal when the generated early votes exceeds the generated late votes by at least a predetermined retard threshold. At least one of the advance threshold or the retard threshold is negative.

BRIEF DESCRIPTION OF THE DRAWINGS

The present disclosure is described in conjunction with the appended figures:

FIG. 6 shows a chart of sample values for setting the advance and retard thresholds.

Figure 1:
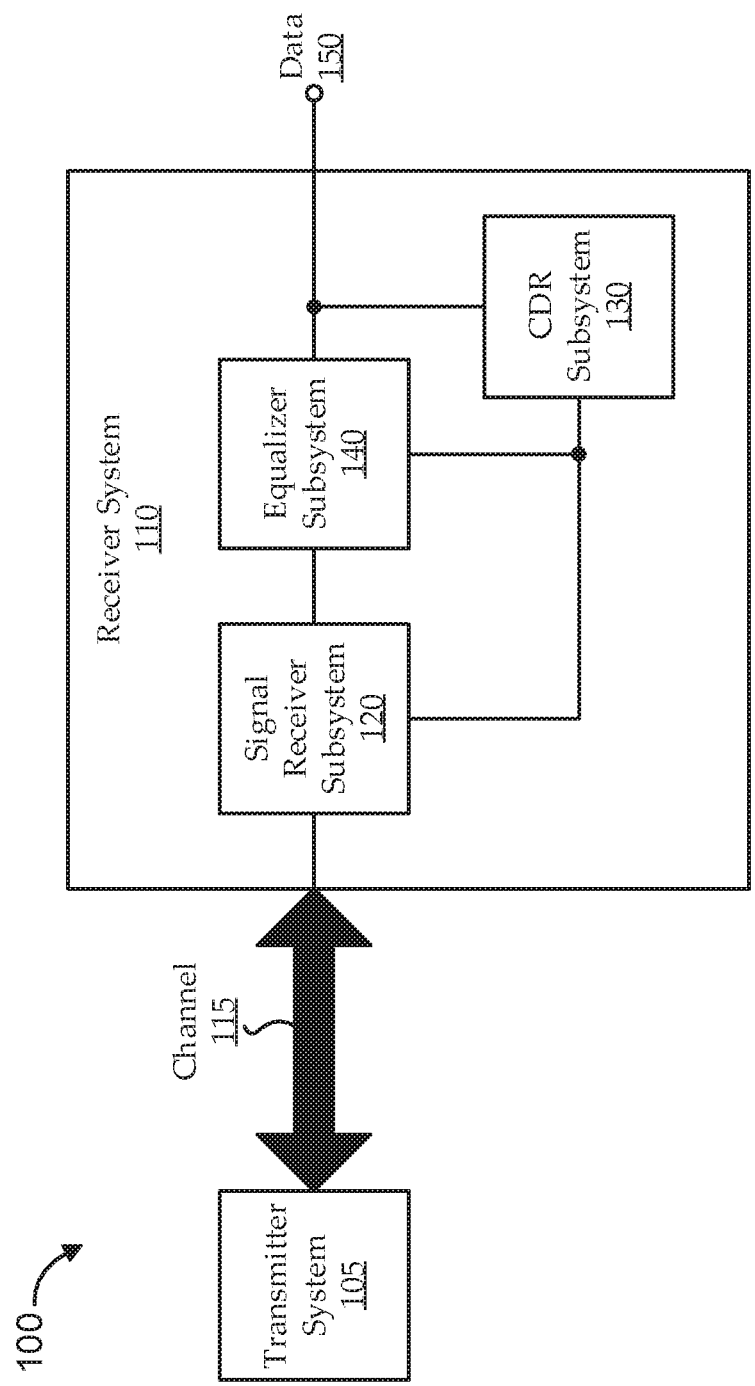
FIG. 1, a block diagram is shown of an illustrative communications environment, according to various embodiments.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Many electronics applications include communications channels that have transmitter and receiver components to move data through the electronics application. Some receiver circuits are serializer/deserializer (SERDES) receiver circuits that can, for example, convert parallel data from the communications channel into a serial data stream for processing, etc. Various functions of the SERDES rely on clocking to effectively sample and/or process the data being received from the channel, and the clock signal is often recovered from the data itself using a clock data recovery (CDR) circuit. One type of CDR circuit (sometimes referred to as a "bang-bang CDR" or an "oversampling CDR") attempts to extract clock timing information from both data and edge samples. Thus, the rate of the resulting clock signal is double the data rate. Another type of CDR circuit (sometimes referred to as a "Muller-Mueller CDR" or "MM CDR") uses data samples, but not edge samples, to recover clock timing information. Thus, the rate of the resulting clock signal is the data rate, and such CDR techniques are often referred to as "at-rate" CDR. At-rate CDR techniques provide various features. For example, avoiding double-rate clocking can appreciably reduce power consumption.

It is generally desirable for the receiver circuit to clock received data in the center of the "data eye," which can improve data recovery, reduce error, increase link margin, etc. Finding the optimal clocking location is typically a dynamic process that involves the CDR circuit and equalization circuitry (e.g., a decision feedback equalizer, linear equalizer, feed-forward equalizer, etc.). Typical at-rate CDR techniques extract timing information by analyzing a channel pulse response at one or more sample locations and determining whether current clocking appears to be early or late with respect to the pulse response. The clocking signal can then be shifted, as appropriate. However, a number of factors, such as inter-channel interference and clock jitter, can tend to frustrate accurate clock data recovery from the channel pulse response.

As used herein, CDR analysis of the channel pulse response is described with reference to a pulse-response precursor "$h(-1)$," a pulse-response cursor "$h(0)$," and a pulse-response postcursor "$h(1)$," where $h(-1)$ and $h(1)$ are adjacent on either side of $h(0)$. The "h" locations effectively indicate where the present clock timing falls with respect to the pulse response. Some at-rate CDR implementations attempt to reach a convergence condition by forcing pulse-response precursor $h(-1)$ to equal pulse-response postcursor $h(1)$ to achieve a symmetric pulse response. Because $h(1)$ is typically compensated by the equalization circuitry, $h(1)$ tends to be kept close to zero, and CDR convergence can attempt to drive $h(-1)$ to zero. In some implementations, for each of a number of iterations defined by a voting window (e.g., 256 iterations), a circuit generates an early vote, a late vote, or a no vote by comparing a sampled $h(-1)$ value with zero. At the end of the voting window, early and late votes can be counted and compared to determine whether there is a statistical indication to advance or retard the clock timing. For example, when late votes exceed early votes (e.g., by more than a threshold), an advance signal is generated by the voting circuit; and when early votes exceed late votes (e.g., by more than the threshold), a retard signal is generated by the voting circuit. As used herein, a "vote" is intended generally to indicate a particular result of an operation, such as a comparison. For example, an "early vote" can include any type of result indicating that the clock timing is early (e.g., a predefined bit or bits, a predefined electrical signal, etc.). Similarly, "counting" of votes can be performed in any suitable manner. One illustrative technique can store voting results (e.g., in a buffer), and count the number of votes of each type. Another illustrative technique can effectively count votes as they are received, for example, by incrementing a counter each time a particular vote occurs. Yet another illustrative technique can maintain a running total count, for example, by incrementing a counter when an early vote is received, decrementing the counter when a late vote is received, and leaving the counter alone when a no vote is received. As described above, this can facilitate CDR convergence and can to drive $h(-1)$ to zero. However, for some long data channels, particularly at higher data rates, a very high precursor may have to be applied to satisfy the condition of locking the CDR to $h(-1)=0$ in front of the peak of the pulse response.

Embodiments described herein use an early/late offset to effectively tune the CDR to a position either earlier or later than the $h(-1)=0$ position. This can improve link margin (and accordingly data recovery), particularly for long data channels and/or at higher data rates. As will be described below, an appreciable difference in effective slope on each side of the pulse-response precursor can tend to skew the voting results and can contribute to the resulting application of a high precursor to satisfy the convergence condition. Accordingly, embodiments use asymmetric voting thresholds for generating each of the advance and retard signals in an attempt to de-skew the voting results and effectively tune the CDR to a more optimal location than the $h(-1)=0$ location.

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Turning first to FIG. 1, a block diagram is shown of an illustrative communications environment 100, according to various embodiments. The communications environment 100 includes a transmitter system 105 and a receiver system 110 in communication via a data channel 115. For example, the transmitter system 105 can include any suitable components, such as a driver, for communicating data over the data channel 115. The data channel 115 can be any parallel or serial, wired or wireless, or other suitable communications channel for carrying the data. The receiver system 110 can be implemented in any suitable manner, for example as an integrated circuit that is part of and/or in communication with very-large-scale integration VLSI circuits, communication systems, storage area networks, local area networks, wide area networks, data centers, memory components, electronic devices, memory systems, and/or computer systems (such as multiple-core processor computer systems, computer systems that include components that communicate via capacitive proximity communication, computer systems that include components that communicate via optical proximity communication, etc.).

As illustrated, the receiver system 110 includes a signal receiver subsystem 120, a CDR subsystem 130, and an equalizer subsystem 140. While the receiver system 110 is illustrated as a simplified functional block diagram to avoid overcomplicating the description and figures, these simplifications should not be construed as limiting embodiments and implementations. The receiver system 110 can include fewer or additional components, and the various functional blocks can each be implemented as one or more discrete components, combined with other functional blocks into a single component, implemented in any suitable architecture or arrangement, etc. For example, the receiver system 110 includes any suitable components for receiving a data signal from the data channel 115 and reliably outputting data 150 as desired by other systems or components in communication with the receiver system 110. The signal receiver subsystem 120 can include amplifiers, filters, analog-to-digital converters, parallel or serial interface components, and/or any other suitable components for converting the received data signal from the data channel 115 into a signal that can be used by other components of the receiver system 110. The equalizer subsystem 140 can include a decision feedback equalizer, a linear equalizer, a feed-forward equalizer, and/or any other suitable equalization components. For example, some implementations of the equalizer subsystem 140 provide feedback equalization to the CDR 130 including outputting a clocking signal to the CDR subsystem 130. The CDR subsystem 130 implements an at-rate CDR, such as a Muller-Mueller CDR, or the like. As described below, embodiments of the CDR subsystem 130 implement a controllable (e.g., programmable) early/late offset for effectively skewing the statistical voting results and tuning the CDR subsystem 130 to a position either earlier or later than the h(−1)=0 position.

Figure 2:
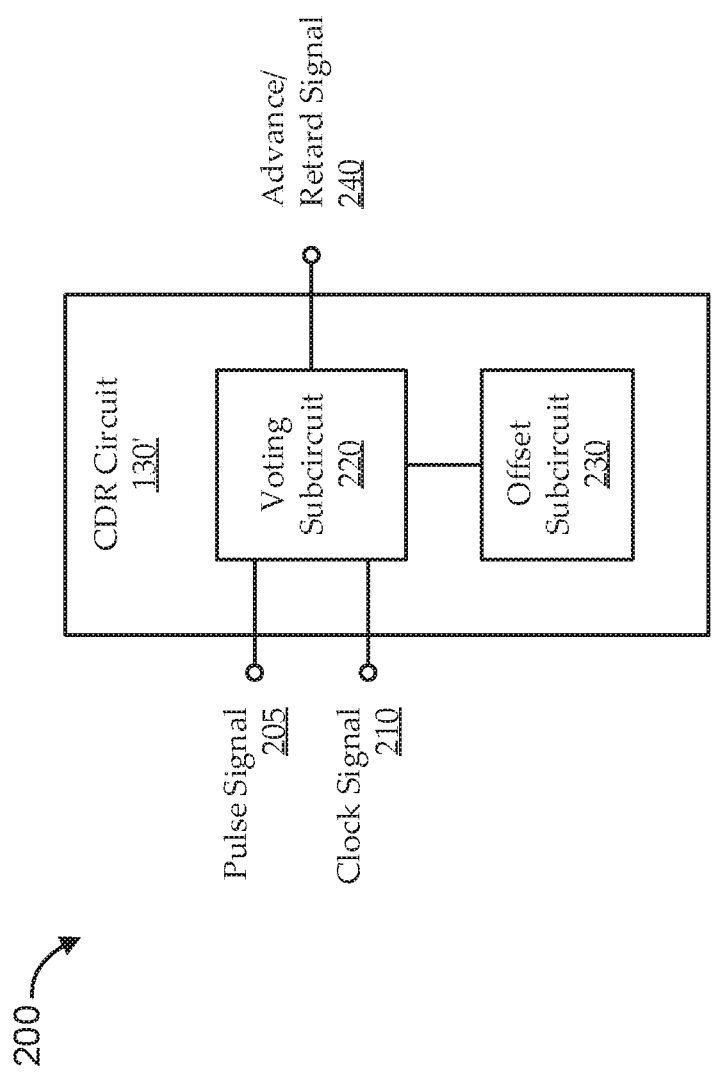
FIG. 2 shows an illustrative circuit block diagram for implementing embodiments of the CDR subsystem.

FIG. 2 shows an illustrative circuit block diagram 200 for implementing embodiments of the CDR subsystem 130 (illustrated as CDR circuit 130'). As illustrated, the CDR circuit 130' includes a voting subcircuit 220 and an offset subcircuit 230. The voting subcircuit 220 can receive a pulse signal 205 that is the channel pulse response of the CDR circuit 130', and the voting subcircuit 220 can receive a clocking signal 210. As described more fully below, the voting subcircuit 220 can generate a number of votes by iteratively comparing a pulse response sample location (e.g., h(−1) or h(1)) to zero, and the voting subcircuit 220 can tally the voting results over a voting window. The offset subcircuit 230 can provide a first threshold for use in making advance determinations and a second threshold for use in making retard determinations. Embodiments of the offset subcircuit 230 permit adjustment of one or both threshold values through programming or in any other suitable manner. For example, a pair of programmable registers can be used to store the two threshold values. The voting subcircuit 220 can compare the tallied voting results to the threshold values from the offset subcircuit 230 to generate and output an advance/retard signal 240.

Figure 3:
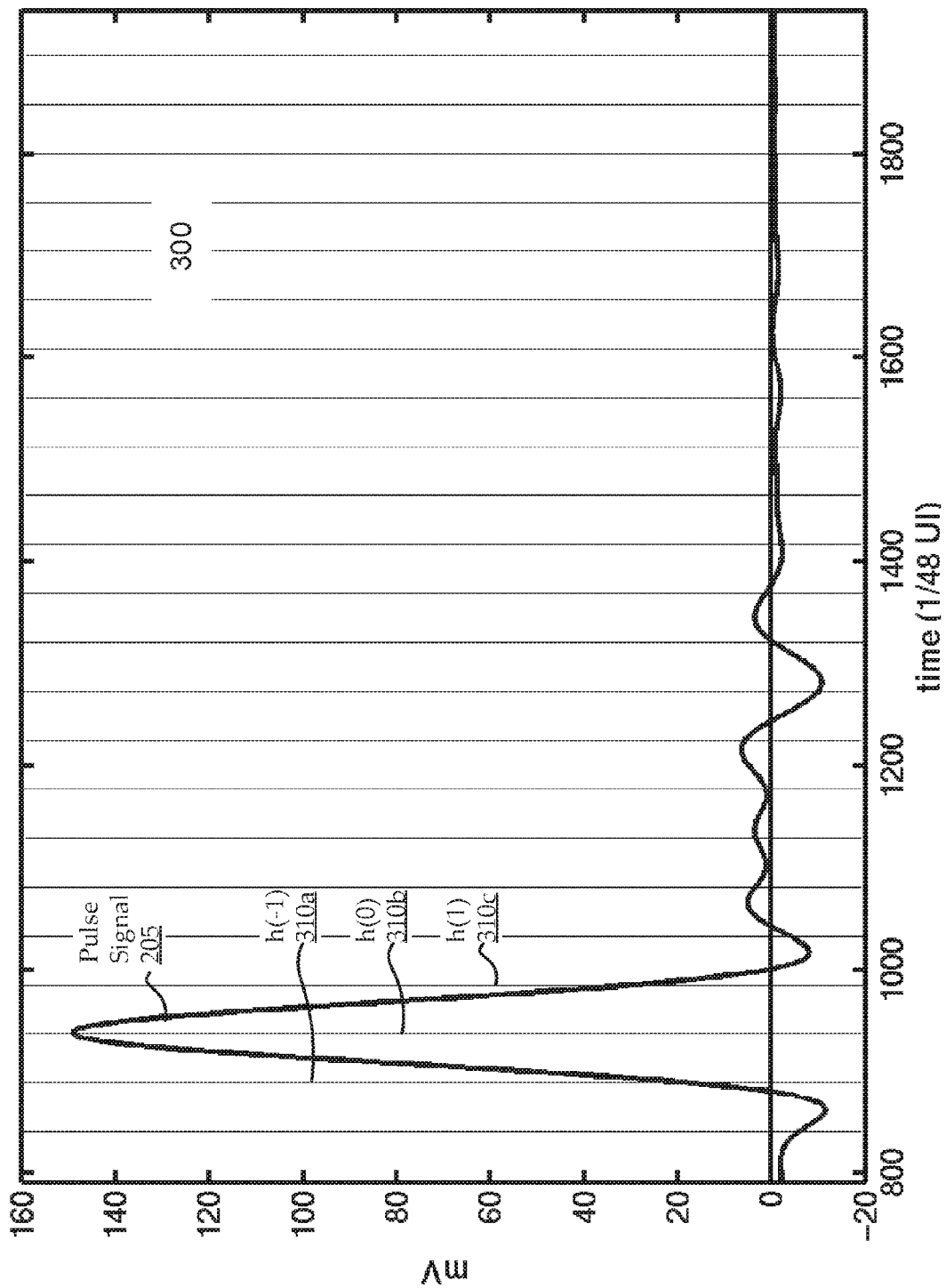
FIG. 3 shows an illustrative pulse response having a pulse signal in context of its pulse-response cursor, a number of pulse-response precursors, and a number of pulse-response postcursors.

For the sake of added clarity, functionality of the CDR subsystem 130 (e.g., the CDR circuit 130') is described with reference to FIGS. 3 and 4. FIG. 3 shows an illustrative pulse response 300 having a pulse signal 205 in context of its pulse-response cursor, a number of pulse-response precursors, and a number of pulse-response postcursors. As illustrated, pulse-response cursor h(0) 310b is located at the peak of the pulse signal 205, for example, where the slope of the pulse signal 205 is approximately zero. A first pulse-response precursor h(−1) 310a is adjacent to the left of the pulse-response cursor h(0) 310b, and a first pulse-response postcursor h(1) 310c is adjacent to the right of the pulse-response cursor h(0) 310b. In the illustrated pulse response 300, neither the first pulse-response precursor h(−1) 310a nor the pulse-response postcursor h(1) 310c are at a zero crossing of the pulse signal 205. As described above, implementations of the equalizer subsystem 140 can attempt to compensate the pulse-response postcursor h(1) 310c to keep it close to zero, and traditional CDR implementations can attempt to converge by driving the pulse-response precursor h(−1) 310a to zero.

Figure 4:
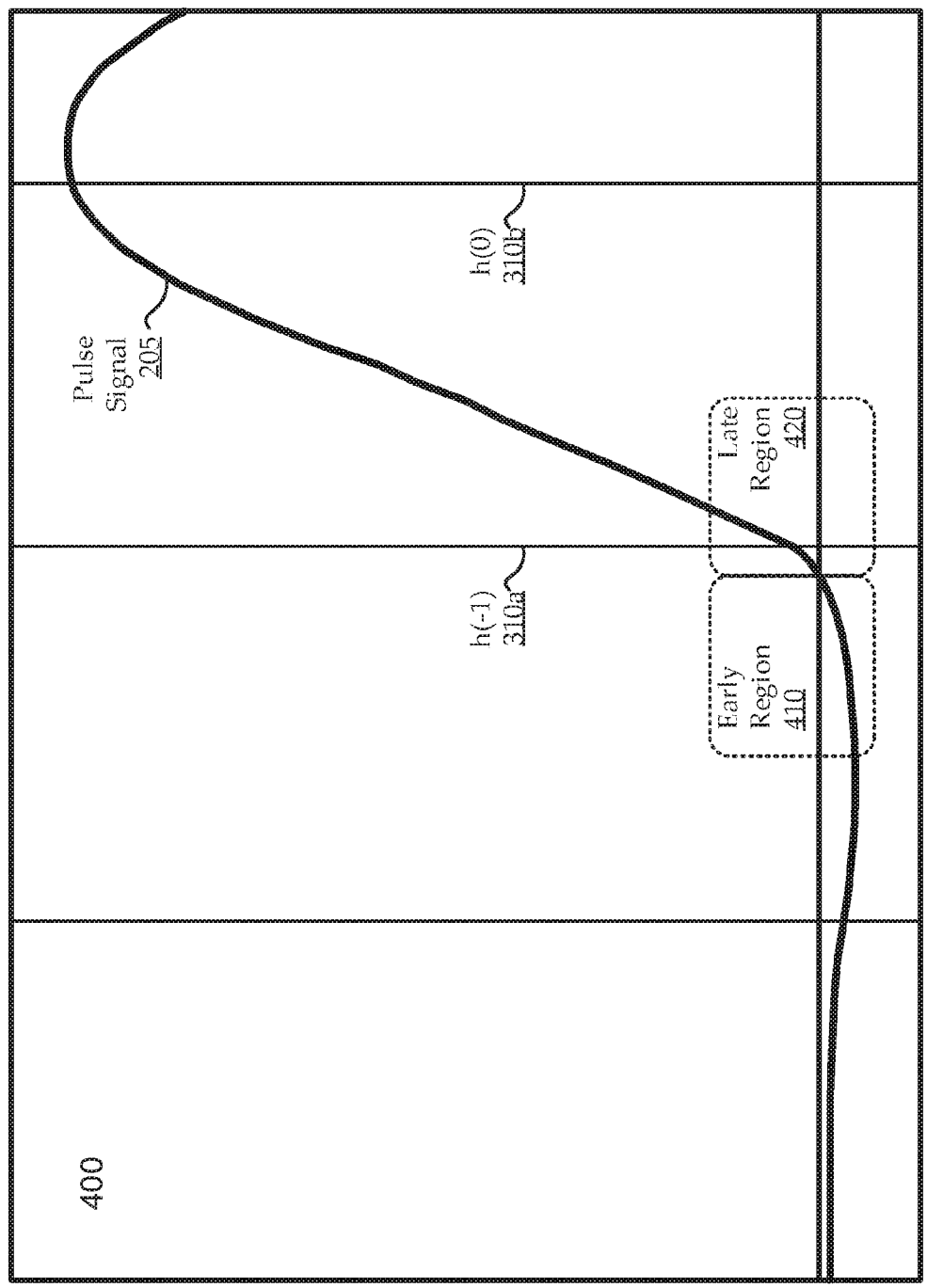
FIG. 4 shows a partial close-up view of an illustrative pulse response having a pulse signal in context of its pulse-response cursor and a first pulse-response precursor $h(-1)$.

FIG. 4 shows a partial close-up view of an illustrative pulse response 300 having a pulse signal 205 in context of its pulse-response cursor 310b and a first pulse-response precursor h(−1) 310a. As illustrated, the pulse signal 205 can typically have a different slope on each side of the pulse signal 205 zero crossing nearest to the first pulse-response precursor h(−1) 310a. For example, in an early region 410 to the left of the zero crossing, the slope of the pulse signal 205 is appreciably less than the slope of the pulse signal 205 in a late region 420 to the right of the zero crossing. Typically, the converse can be seen around the zero crossing nearest to the first pulse-response postcursor h(1) 310c (i.e., the slope of the pulse signal 205 is appreciably greater to the left of the zero crossing than it is to the right of the zero crossing).

As described above, extraction of clock timing information can be performed by voting over a number of iterations and obtaining a statistical indication as to whether the current timing is early or late. In some implementations, for each of a number of iterations defined by a voting window (e.g., 256 iterations), the voting subcircuit 220 of the CDR circuit 130' generates an early vote, a late vote, or a no vote by comparing a sampled h(−1) value with zero. For example, clock jitter, crosstalk from adjacent channels, and/or other sources of measurement noise can cause the sampled h(−1) value to change across iterations and result in different votes. Further, these effects can manifest differently on either side of the zero crossing due to the different slopes. For example, the measurement noise can have an appreciably greater statistical impact on the voting results when the h(−1) location is in the early region 410, given the smaller slope of the pulse signal 205 in that region. Conversely, the measurement noise can have an appreciably lesser statistical impact on the voting results when the h(−1) location is in the late region 420, given the larger slope of the pulse signal 205 in that region.

Embodiments of the voting subcircuit 220 implement an early/late offset to effectively tune the CDR to a position either earlier or later than the h(−1)=0 position. At the end of the voting window, embodiments of the voting subcircuit 220 effectively tally early and late votes and compare the tallied results to determine whether there is a statistical indication to advance or retard the clock timing. The voting subcircuit 220 compares the results using a first "advance" threshold when making the advance determination, and the voting subcircuit 220 compares the results using a second "retard" threshold when making the retard determination. The first and second thresholds can be adjustable, programmable, or the like, according to some implementations of the offset subcircuit 230. According to some implementations, when late votes exceed early votes by at least the advance threshold amount (i.e., late votes−early votes>advance threshold), an advance signal is generated by the voting subcircuit 220; and when early votes exceed late votes by at least the retard threshold amount (i.e., early votes−late votes>retard threshold), a retard signal is generated by the voting subcircuit 220.

For example, if the advance threshold is greater than the retard threshold, the voting subcircuit 220 can incline toward generating the advance/retard signal 240 as a retard signal, thereby causing the CDR circuit 130' to tend to adapt to a position later than h(−1)=0 (e.g., in the late region 420). Conversely, if the advance threshold is less than the retard threshold, the voting subcircuit 220 can incline toward generating the advance/retard signal 240 as an advance signal, thereby causing the CDR circuit 130' to tend to adapt to a position earlier than h(−1)=0 (e.g., in the early region 410). In one simulated CDR 130 implementation, setting the retard threshold to be four times the advance threshold yielded a 5-millivolt improvement in link margin over a corresponding traditional approach.

The threshold values used by the offset subcircuit 230 can be set to any suitable values. For the sake of illustration, FIG. 6 shows a chart 600 of sample values for setting the advance and retard thresholds. A first column pair 610 shows a number of illustrative tallied voting results, which may be received from the voting subcircuit 220. For the sake of simplicity, each tallied voting result shows 30 early votes and some number of late votes, ranging from 20 to 40 (i.e., the various results demonstrate a variety of scenarios in which the early votes exceed the late votes, the late votes exceed the early votes, or the early and late votes are equal).

Each of the remaining column pairs 620 shows an outcome for an illustrative advance/retard signal 240 output according to a respective illustrative set of advance and retard thresholds. Cells shown with white background and black text indicate an advance determination, cells shown with black background and white text indicate a retard determination, and cells shown with patterned background and black text indicate no advance or retard. In the first illustrative scenario (illustrated by column pair 620*a*), the advance and retard thresholds are both set to '7'. Accordingly, when the early votes exceed the late votes by more than 7 (i.e., when there are 22 or fewer late votes), an advance determination is made; when the late votes exceed the early votes by more than 7 (i.e., when there are 38 or more late votes), a retard determination is made; and in all other cases (i.e., when there between 23 and 37 late votes), no determination is made. In such a scenario, many outcomes (and, accordingly, many votes) are essentially thrown out (i.e., no advance or retard determination is made), which can be undesirable.

In a second illustrative scenario (illustrated by column pair 620*b*), the advance threshold is set to '0', and the late threshold is set to '7'. Accordingly, when the early votes exceed the late votes by more than 0 (i.e., when there are 29 or fewer late votes), an advance determination is made; when the late votes exceed the early votes by more than 7 (i.e., when there are 38 or more late votes), a retard determination is made; and in all other cases (i.e., when there between 23 and 37 late votes), no determination is made. Such settings may be used to make a retard determination relatively less likely than an advance determination (i.e., to bias the results toward an advance determination). However, as in the first scenario, many outcomes are still essentially thrown out.

In a third illustrative scenario (illustrated by column pair 620*c*), the advance and retard thresholds are set to '0'. Accordingly, when the early votes exceed the late votes by more than 0 (i.e., when there are 29 or fewer late votes), an advance determination is made; when the late votes exceed the early votes by more than 0 (i.e., when there are 31 or more late votes), a retard determination is made; and in the single remaining case (i.e., when the early and late votes are equal), no determination is made. Such settings tend to throw away much fewer outcomes than in the first two scenarios. However, such settings are not very useful in biasing the outcomes toward advance or retard determinations.

In a fourth illustrative scenario (illustrated by column pair 620*d*), the advance threshold is set to '−8' (i.e., negative 8), and the retard threshold is set to '7'. Accordingly, when the early votes exceed the late votes by more than −8 (i.e., when there are 37 or fewer late votes), an advance determination is made; and when the late votes exceed the early votes by more than 7 (i.e., when there are 38 or more late votes), a retard determination is made. There is no remaining case in which no determination is made. Such a scenario illustrates that a negative threshold can be used to reduce (or even eliminate, such as in this scenario) outcomes that are effectively thrown away, while still permitting biasing of the outcomes toward advance or retard determinations. For example, when one threshold is set to −N, and the other threshold is set to +(N−1) (i.e., as is the case in the fourth illustrative scenario, where N=8), there are no discarded outcomes.

The illustrated scenarios assume that the logical determination is whether one set of votes exceeds the other by greater than a threshold, but any suitable logical determination can be used. For example, alternative implementations can assume that the logical determination is whether one set of votes exceeds the other by at least a threshold (i.e., greater than or equal to). In such an implementation, the outcomes of the fourth illustrative scenario can be duplicated by setting the advance threshold is set to '—7' and the retard threshold to '8'. Further, the negative thresholds can be implemented in any suitable manner. For example, the thresholds can be stored in registers (or any suitable memory). In one implementation, a '0' threshold value can be mapped to some other positive base value (i.e., "negative" is any value less than the mapped base value). In another implementation, a bit in the register (e.g., the most significant bit) can be asserted (or de-asserted) to indicate a negative value.

Permitting negative thresholds can also permit occurrences with conflicting outcomes. For example, in a fifth illustrative scenario (illustrated by column pair 620*e*), the advance threshold is set to '−5', and the retard threshold is set to '2'. Accordingly, when the early votes exceed the late votes by more than −5 (i.e., when there are 34 or fewer late votes), an advance determination is indicated; and when the late votes exceed the early votes by more than 2 (i.e., when there are 33 or more late votes), a retard determination is indicated. As shown there are two cases (i.e., where there are 33 or 34 late votes) in which both determinations are indicated (i.e., both thresholds are exceeded concurrently). Such outcomes can be handled in various ways, according to different implementations. In one implementation, only certain threshold values are permitted to avoid such outcomes. In another implementation, such outcomes are treated in the same way as a "no determination" outcome (e.g., the outcome is effectively thrown away). Other implementations can be pre-programmed to treat such outcomes as either an advance or a retard outcome, as desired (e.g., for further biasing).

Figure 5:
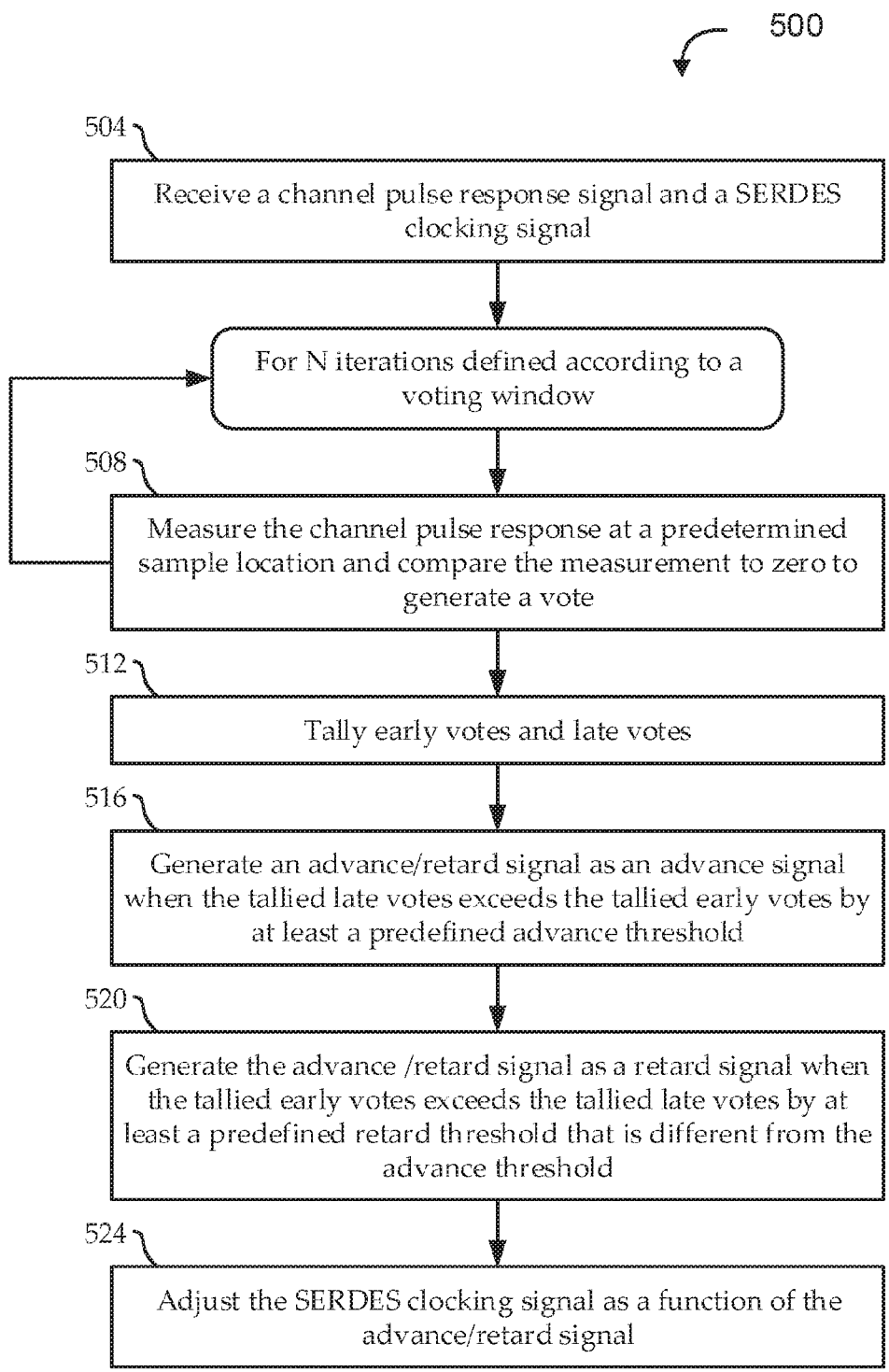
FIG. 5 shows a flow diagram of an illustrative method for at-rate clock data recovery, according to various embodiments.

FIG. 5 shows a flow diagram of an illustrative method 500 for at-rate clock data recovery, according to various embodiments. Embodiments of the method 500 begin at stage 504 by receiving a channel pulse response signal and a clocking signal. For example, the pulse signal is the channel pulse response of a CDR circuit, and the clocking signal reflects clocking information as presently recovered from the received data by the CDR circuit. At stage 508, for each of N iterations defined according to a voting window (e.g., 256 iterations), embodiments measure the channel pulse response at a predetermined sample location and compare the measurement to zero to generate a vote. In some implementations, the sample location is a first pulse-response precursor h(−1) or a first pulse-response postcursor h(1), and each vote is an "early" vote, a "late" vote, or a "no" vote. For example, using h(−1) as the sample location, an early vote can be generated when the h(−1) measurement is below zero (e.g., by some threshold amount), indicating that the h(−1) location is early with respect to the corresponding pulse-response zero crossing. Similarly, a late vote can be generated when the h(−1) measurement is greater than zero (e.g., by some threshold amount), indicating that the h(−1) location is late with respect to the corresponding pulse-response zero crossing; and a no vote can be generated when the h(−1) measurement is substantially equal to zero (e.g., within some threshold distance from zero, within a measurement error from zero, etc.), indicating that the h(−1) location is substantially at the corresponding pulse-response zero crossing.

Due to noise and other factors, measurements at the sample location typically range, so that a given voting window can typically include both early and late votes (and sometimes "no" votes). At stage 512, the early and late votes can be tallied. At stage 516, an advance/retard signal can be generated as an advance signal when the tallied late votes exceeds the tallied early votes by at least a predefined advance threshold. At stage 520, the advance/retard signal can be generated as a retard signal when the tallied early votes exceeds the tallied late votes by at least a predefined retard threshold that is different from the advance threshold. For example, an offset subcircuit can provide a first threshold for use in making advance determinations and a second threshold for use in making retard determinations, where the two thresholds are different (e.g., and programmable). In some implementations, one of the advance or retard thresholds can be negative. In some embodiments, the SERDES clocking signal (i.e., the clocking signal received at stage 504) can be adjusted as a function of the advance/retard signal generated in either stage 516 or stage 520.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The steps of a method or algorithm or other functionality described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A system for at-rate clock data recovery comprising:
   signal receiver subsystem that operates to receive a data signal from a data channel and to output a channel pulse response signal as a function of sampling the data signal according to a sampling clock phase that is dynamically adjustable according to an advance/retard signal;
   an offset circuit that operates to store an advance threshold and a retard threshold, wherein one of the advance threshold or the retard threshold is a negative integer N; and
   a voting circuit in communication with the offset circuit that operates to:
     generate a plurality of votes each by measuring a pulse signal at a predetermined sample location that corresponds to the sampling clock phase and comparing the measurement to a reference level to generate an early vote when the measured pulse signal at the predetermined sample location compared to the reference level indicates that the sample location precedes a reference-level crossing associated with the predetermined sample location, and to generate a late vote when the measured pulse signal at the predetermined sample location compared to the reference level indicates that the reference-level crossing associated with the predetermined sample location precedes the sample location;

generate the advance/retard signal, the advance/retard signal comprising an advance signal when the generated late votes exceeds the generated early votes by at least the advance threshold, and the advance/retard signal comprising a retard signal when the generated early votes exceeds the generated late votes by at least the retard threshold; and feed back the advance/retard signal to the signal receiver subsystem for dynamic adjustment of the sampling clock phase.

2. The system of claim 1, wherein the other of the advance threshold or the retard threshold is at least positive (N−1).

3. The system of claim 1, wherein:

the voting circuit operates to generate the advance signal only when the generated late votes exceeds the generated early votes by at least the advance threshold, while the generated early votes does not exceed the generated late votes by at least the retard threshold;

the voting circuit operates to generate the retard signal only when the generated early votes exceeds the generated late votes by at least the retard threshold, while the generated late votes does not exceed the generated early votes by at least the advance threshold; and the voting circuit further operates to generate no signal when the generated late votes exceeds the generated early votes by at least the advance threshold, while the generated early votes also exceeds the generated late votes by at least the retard threshold.

4. The system of claim 1, wherein:

the voting circuit further operates to receive a clocking signal corresponding to SERDES clocking information recovered by a clock data recovery circuit; and the predetermined sample location corresponds to the clocking signal.

5. The system of claim 1, wherein the reference level is zero.

6. The system of claim 1, wherein the plurality of votes is a number of votes defined by a voting window.

7. The system of claim 1, wherein the offset circuit is programmable to permit programming of the advance threshold and the retard threshold.

8. The system of claim 1, further comprising:

an integrated circuit having at least the offset circuit and the voting circuit integrated thereon.

9. A method for at-rate clock data recovery, the method comprising:

receiving a data signal from a data channel;

outputting a pulse signal as a function of sampling the data signal according to a sampling clock phase;

generating a plurality of votes each by measuring the pulse signal at a sample location corresponding to the sampling clock phase and comparing the measurement to a reference level, wherein each vote generated as an early vote when the measured pulse signal at the predetermined sample location compared to the reference level indicates that the sample location precedes a reference-level crossing associated with the predetermined sample location, and wherein each vote generated as a late vote when the measured pulse signal at the predetermined sample location compared to the reference level indicates that the reference-level crossing associated with the predetermined sample location precedes the sample location;

generating an advance/retard signal to comprise an advance signal when the generated late votes exceeds the generated early votes by at least a predetermined advance threshold;

generating the advance/retard signal to comprise a retard signal when the generated early votes exceeds the generated late votes by at least a predetermined retard threshold, wherein at least one of the advance threshold or the retard threshold is a negative integer N; and dynamically adjusting the sampling clock phase according to the generated advance/retard signal.

10. The method of claim 9, wherein the other of the advance threshold or the retard threshold is at least positive (N−1).

11. The method of claim 9, further comprising:

generating no signal when the generated late votes exceeds the generated early votes by at least the advance threshold while the generated early votes also exceeds the generated late votes by at least the retard threshold, wherein generating the advance signal is performed only when the generated late votes exceeds the generated early votes by at least the advance threshold while the generated early votes does not exceed the generated late votes by at least the retard threshold, and wherein generating the retard signal is performed only when the generated early votes exceeds the generated late votes by at least the retard threshold while the generated late votes does not exceed the generated early votes by at least the advance threshold.

12. The method of claim 9, wherein the reference level is zero.

13. The method of claim 9, wherein generating the plurality of votes comprises accumulating a number of votes according to a predetermined voting window.

* * * * *